(12) United States Patent
Kuo et al.

(10) Patent No.: US 6,534,598 B2
(45) Date of Patent: Mar. 18, 2003

(54) FAST-DRY, HIGH SOLIDS COATINGS BASED ON MODIFIED ALKYD RESINS

(75) Inventors: Thauming Kuo, Kingsport, TN (US); Mark D. Clark, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/094,136

(22) Filed: Mar. 11, 2002

(65) Prior Publication Data

US 2002/0183453 A1 Dec. 5, 2002

Related U.S. Application Data

(63) Continuation of application No. 09/596,269, filed on Jun. 16, 2000.
(60) Provisional application No. 60/140,788, filed on Jun. 25, 1999.

(51) Int. Cl.[7] .................... C08L 77/02; C08L 33/06
(52) U.S. Cl. ............ 525/408; 525/437; 525/438; 524/561; 524/562
(58) Field of Search ................. 525/408, 437, 525/438; 524/561, 562

(56) References Cited

U.S. PATENT DOCUMENTS

| | | | |
|---|---|---|---|
| 3,196,119 A | 7/1965 | Boller et al. | |
| 3,641,201 A | 2/1972 | Heilman | |
| 4,113,702 A | 9/1978 | Psencik | |
| 4,131,579 A | 12/1978 | Mummenthey et al. | |
| 4,474,941 A | 10/1984 | Wilk et al. | |
| 4,690,980 A | 9/1987 | Singer et al. | |
| 4,719,254 A | 1/1988 | Levine | |
| 5,589,135 A | 12/1996 | Doomen et al. | |
| 6,242,528 B1 * | 6/2001 | Clark et al. | 524/560 |
| 6,344,503 B1 | 2/2002 | Nkansah et al. | |

FOREIGN PATENT DOCUMENTS

| | | |
|---|---|---|
| EP | 0351024 | 1/1990 |
| EP | 1002842 | 5/2000 |
| JP | 48085628 | 11/1993 |

\* cited by examiner

*Primary Examiner*—James J. Seidleck
*Assistant Examiner*—Olga Asinovsky
(74) *Attorney, Agent, or Firm*—Morgan, Lewis & Bockius LLP

(57) ABSTRACT

An ambient oxidative cure composition based on an acrylate functionalized alkyd resin is described. A method of preparing an ambient oxidative cure composition based on an acrylate functionalized alkyd resin is also described. Such ambient oxidative cure compositions may be used in, for example, fast drying, high solid paint or enamel compositions or formulations.

17 Claims, No Drawings

FAST-DRY, HIGH SOLIDS COATINGS BASED ON MODIFIED ALKYD RESINS

CROSS REFERENCE TO RELATED APPLICATIONS

This application is a Continuation patent application under 37 C.F.R. 1.53(b), of copending prior application Ser. No. 09/596,269, filed on Jun. 16, 2000, which claims benefit of priority under 35 U.S.C. § 119(e) to U.S. Provisional Application No. 60/140,788 filed on Jun. 25, 1999, which is herein incorporated in its entirety by reference.

BACKGROUND OF THE INVENTION

1. Field of the Invention

The invention relates to an ambient oxidative cure composition containing an acrylate functionalized alkyd resin. The invention also relates to methods of preparing an ambient oxidative cure composition containing an acrylate functionalized alkyd resin. Such compositions are useful in preparing fast-dry, high solids coatings such as, for example, enamels.

2. Description of Related Art

In recent years, considerable effort has been expended by the coatings industry to develop low or zero VOC containing coating formulations. Regulations to limit the amount of VOC content of industrial coatings have encouraged research and development to explore new technologies directed at reducing solvent emissions from industrial solvent-based coatings operations such as automotive, appliance, general metal, furniture, and the like. However, while the move to reduced organic solvent-based compositions brings health and safety benefits, these lower VOC coating compositions must still meet or exceed the performance standards expected from solvent-based compositions.

Alkyd resins are one of the most common binders used for ambient-cure, solvent-based coatings. Resistance properties of traditional solvent-borne alkyd resins are developed via autooxidative crosslinking of the alkyd film. Crosslinking occurs when the activated methylene groups in the unsaturated fatty acids or oils of the alkyd are oxidized in air to give hydroperoxides which subsequently decompose to generate free radicals for various crosslinking mechanisms. This oxidative crosslinking process is commonly accelerated by adding driers such as, for example, various salts of cobalt, zirconium, calcium, and manganese. However, while alkyd resins have shown, and continue to show promise, they have relatively slow "dry" and/or cure times, particularly at ambient temperatures. Various modifications have been made to alkyd resins in an attempt to address such concerns.

One such attempt includes polymerization of an alkyd resin with a vinyl compound, such as styrene or methyl methacrylate, via a free-radical reaction to produce a vinyl-alkyd copolymer or a vinyl alkyd. Vinyl alkyd resins generally have a higher molecular weight and a higher $T_g$ and accordingly produce coatings with reduced tack-free time (solvent evaporation). However, the through-dry time (oxidation of the film) of such coatings takes longer due to the decreased degree of unsaturation in the alkyd as a result of copolymerization with the vinyl compound. In addition, paint formulations which contain vinyl alkyd resins require a greater amount of solvent due to increased molecular weight and $T_g$ of the vinyl alkyd.

JP 48085628 describes a modified alkyd resin using glycidyl acrylate, glycidyl methacrylate, or its derivative. Drying oil-modified alkyd resins having —$CO_2H$ groups and an oil length of 20–80 are treated with glycidyl acrylate, glycidyl methacrylate, or its derivative in the presence of a polymerization inhibitor. The resulting resin is mixed with a photosensitizer or photoinitiator to give a coating composition which hardens with UV irradiation. However, these resin compositions were not suitable for ambient oxidative cure, high-solids coating applications.

Thus there still exists a need in the art for a modified or functionalized alkyd resin capable of undergoing crosslinking upon film formation which can be used to prepare ambient oxidative cure, fast-dry and high solids coatings having low VOC. Such coatings would exhibit the properties and advantages of high VOC coatings.

SUMMARY OF THE INVENTION

The present invention answers this need by providing an ambient oxidative cure composition comprising an acrylate functionalized alkyd resin, at least one drier, and an organic solvent. An acrylate functionalized alkyd resin is an alkyd resin modified with glycidyl acrylate via a non-free radical reaction where the glycidyl moiety of the glycidyl acrylate is the reaction moiety such that the resulting alkyd resin contains terminal reactive acrylate groups or moieties. Such an acrylate functionalized alkyd resin exhibits superior through-dry time properties. Furthermore, an acrylate functionalized alkyd resin of the invention exhibits superior tack-free time properties which previously could only be improved by increasing the molecular weight and $T_g$ of the alkyd resin. Since the amount of VOC generally added to alkyd resin compositions and/or formulations is directly related to the molecular weight and $T_g$ of the alkyd resin, compositions or formulations containing an acrylate functionalized alkyd resin of the invention would require less VOC.

The invention also relates a method of preparing an ambient oxidative cure composition comprising the step of contacting an acrylate functionalized alkyd resin with at least one drier in the presence of an organic solvent.

DETAILED DESCRIPTION OF THE INVENTION

The invention provides an ambient oxidative cure composition comprising an acrylate functionalized alkyd resin, at least one drier, and an organic solvent. In a preferred embodiment of the invention, an ambient oxidative cure composition contains about 50 to about 85 wt % based on the total weight of the composition of an acrylate functionalized alkyd resin, about 10 to about 50 wt % based on the total weight of the composition of an organic solvent, and about 0.01–1.0 wt % based on the total weight of the composition of at least one drier. According to the invention, an ambient oxidative cure composition exhibits improved tack-free and through-dry times, and may be used in enamel compositions having reduced VOC and fast through-dry and tack-free times.

An acrylate functionalized alkyd resin is an alkyd resin containing terminal reactive acrylate groups or moieties. An acrylate functionalized alkyd resin is the reaction product of a hydroxyl functional alkyd resin, an acid anhydride, and a glycidyl acrylate of which the glycidyl moiety is the reactive moiety. In a preferred embodiment of the invention, the acrylate functionalized alkyd resin comprises the reaction product of: (i) about 79 to about 95 wt % of a hydroxyl functional alkyd resin; (ii) about 2 to about 8 wt % of an acid anhydride; and (iii) about 3 to about 13 wt % of a glycidyl acrylate, each as described herein, wherein the weight percents are based on the total weight of (i), (ii) and (iii).

A hydroxyl functional alkyd resin may be any alkyd resin containing hydroxyl functionality known in the art. The hydroxyl functional alkyd may be prepared by reacting a diol, a polyol, a diacid, a monofunctional acid, and a fatty acid, fatty ester, or naturally occurring-partially saponified oil, optionally, in the presence of a catalyst. Preferably, a hydroxyl functional alkyd resin is the reaction product of (a) 0 to about 30 mole % of a diol, (b) about 10 to about 40 mole % of a polyol, (c) about 20 to about 40 mole % of a diacid, (d) 0 to about 10 mole % of a monofunctional acid, (e) about 10 to about 40 mole % of a fatty acid, fatty ester, or naturally occurring oil, and, optionally, (f) a catalyst, wherein the mole percents are based on the total moles of (a), (b), (c), (d), (e) and (f) if present. Suitable examples of each of the components of the hydroxyl functional alkyd resin include those known in the art including, but not limited to, those discussed below. *Resins for Surface Coatings*, Vol. 1, p. 127, ed. by P. K. T. Oldring and G. Hayward, SITA Technology, London, UK.

The fatty acid, fatty ester, or naturally occurring-partially saponified oil may be any fatty acid, fatty ester, or naturally occurring-partially saponified oil known in the art used in the formation of an alkyd resin. In a preferred embodiment, at least one monobasic fatty acid, fatty ester, or naturally occurring-partially saponified oil is used and selected from the following formulae (I), (II), and (III):

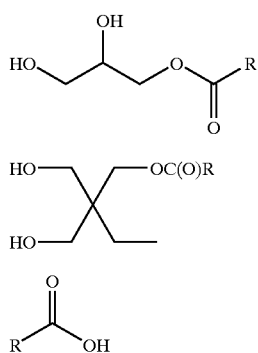

In formulae (I); (II), and (III), R is a saturated or unsaturated $C_8$–$C_{20}$ alkyl group. More preferably, R is one of the following unsaturated $C_{17}$ alkyl groups:

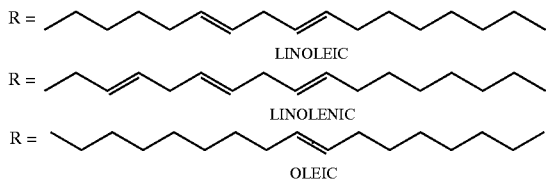

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid (e.g. PAMOLYN 200, commercially available from Hercules), rosin acid, neodecanoic acid, neopentanoic acid, isostearic acid, 12-hydroxystearic acid, cottonseed acid, and the like.

The polyol used in the preparation of the hydroxyl functional alkyd resin itself or the monobasic fatty acid or fatty ester is preferably selected from aliphatic, alicyclic, and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE).

In addition to the polyol, a diol may be used in the preparation of the hydroxyl functional alkyd resin. Examples of suitable diols include, but are not limited to, neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, and hydrogenated bisphenol A. Preferably, the diol is neopentyl glycol (NPG).

The diacid or dicarboxylic acid and monofunctional or monocarboxylic acid component of the hydroxyl functional alkyd resin may be any diacid or monofunctional acid known in the art used in the formation of an alkyd resin. The dicarboxylic acid may be, for example, isophthalic acid, phthalic anhydride(acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, maleic anhydride, fumaric acid, succinic anhydride, succinic acid, 2,6-naphthalenedicarboxylic acid, or glutaric acid and the like. Preferably, the dicarboxylic acid is isophthalic acid, phthalic anhydride, or phthalic acid. A monofunctional acid may also be used such as, for example, benzoic acid, acetic acid, propionic acid, and butanoic acid.

Optionally, a catalyst may be used to promote the formation of a hydroxyl functional alkyd resin. The catalyst may be any catalyst known in the art used in the formation of an alkyd resin. Preferably, the catalyst is an acid catalyst such as, for example, FASCAT 4100. The amount of catalyst added promotes the formation of a hydroxyl functional alkyd resin as described above and may be determined by routine experimentation as understood by those skilled in the art. Preferably, a catalyst is added in amounts ranging from about 0.01–1.00 wt % based on the amount of reactants.

A hydroxyl functional alkyd resin may be prepared at a temperature range of about 170–230° C., more preferably 180–220° C. and most preferably, 190–210° C. In a preferred embodiment of the invention, a hydroxyl functional alkyd resin has a hydroxyl number of about 80 to about 180 mg KOH/g, an acid number of 0 to about 10 mg KOH/g, a number average molecular weight of about 700 to about 2000, and a $T_g$ of less than about 25° C.

Suitable acid anhydrides include those known in the art. Examples of suitable acid anhydrides include, but are not limited to, trimellitic anhydride, phthalic anhydride, maleic anhydride, and fumaric anhydride. Preferably, trimellitic anhydride is used.

The glycidyl acrylate may be any substituted or unsubstituted acrylate containing an epoxide or glycidyl moiety that upon reaction with a hydroxyl functional alkyd resin and an acid anhydride will produce an acrylate functionalized alkyd resin capable of effecting crosslinking during the curing process, each as described above. According to the invention, upon reaction with a hydroxyl functional alkyd resin and an acid anhydride, the glycidyl moiety of the glycidyl acrylate exhibits greater reactivity than the acrylate moiety, i.e. it is the glycidyl moiety which undergoes reaction with the hydroxyl functional alkyd resin and acid anhydride. Suitable substituents for the acrylate portion of the glycidyl acrylate include $C_1$–$C_{18}$ alkyl groups to form classes of compounds such as, for example, alkylacrylates (e.g. methacrylates) and crotonates. Preferably, the glycidyl acrylate is glycidyl methacrylate.

An acrylate functionalized alkyd resin may be prepared by reacting a hydroxyl functional alkyd resin with an acid anhydride, each as described above, to produce a carboxyl functional alkyd resin and reacting the carboxyl functional alkyd resin with a glycidyl acrylate to produce an acrylate functionalized alkyd resin, as described above. An acrylate functionalized alkyd resin may be prepared at a temperature range of about 100–170° C., more preferably about 115–165° C., and most preferably, about 125–155° C.

In a preferred embodiment of the invention, an acrylate functionalized alkyd resin is prepared by reacting (a) 0 to about 30 mole % of a diol, (b) about 10 to about 40 mole % of a polyol, (c) about 20 to about 40 mole % of a diacid, (d) 0 to about 10 mole % of a monofunctional acid, in the presence of (f) a catalyst, each as described above, at about 180–220° C. until the collection of the condensate (water) stops to form an intermediate alkyd; reacting the intermediate alkyd with (e) about 10 to about 40 mole % of a fatty acid, fatty ester, or naturally occurring-partially saponified oil, at about 190–220° C. until an acid number of less than about 5 is obtained to form (i) a hydroxyl functional alkyd resin, each as described above, wherein the mole percents are based on the total moles of (a), (b), (c), (d), (e) and (f); reacting the hydroxyl functional alkyd resin (i) with about 2 to about 8 wt % of(ii) an acid anhydride at about 150–165° C. for about 2–6 hours until a clear reaction mixture is obtained and thereby form a carboxyl functional alkyd resin, each as described above; and reacting the carboxyl functional alkyd resin with about 3 to about 12 wt % of (iii) glycidyl acrylate, at about 125–155° C. until an acid number of less than about 5 is obtained and thereby form the desired acrylate functionalized alkyd resin, each as described above, wherein the weight percents are based on the total weight of (i), (ii) and (iii).

According to the invention, the amount of organic solvent required in the final ambient oxidative cure composition is reduced since the acrylate functionalized alkyd resin, as described above, exhibits lower $T_g$ values. The organic solvent may be any suitable solvent. Examples of suitable organic solvents include, but are not limited to, xylene, benzene, toluene, and mineral spirits. Preferably, the organic solvent is xylene. An ambient oxidative cure composition of the invention has a high solids content of generally greater than about 70%.

The drier of an ambient cure composition of the invention may be any drier known in the art. Examples of suitable driers include, but are not limited to, various salts of cobalt, zirconium, calcium, zinc, and manganese. Preferably, the drier is a cobalt drier. Mixtures of driers, i.e. a drier system, may also be used.

In a preferred embodiment of the invention, an ambient oxidative cure composition, as described above, may also contain at least one pigment to form an ambient oxidative cure enamel composition. Preferably, the pigment is present in an amount of about 30 to about 60 wt % based on the total weight of the composition. Examples of suitable pigments include those recognized by those of ordinary skill in the art of surface coatings. For example, the pigment may be a typical organic or inorganic pigment, especially those set forth by the Colour Index, 3d Ed., 2d Rev., 1982, published by the Society of Dyers and Colourists in association with the American Association of Textile Chemists and Colorists. Other examples of suitable pigments include, but are not limited to, the following: titanium dioxide, barytes, clay, or calcium carbonate, CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1. Preferably, the pigment is titanium oxide. Colorants such as, for example, phthalocyanine blue, molybdate orange, or carbon black may be also be added to the ambient cure oxidative cure enamel composition.

An ambient oxidative cure composition, preferably, an ambient oxidative cure enamel composition, may be coated onto a substrate and cured using techniques known in the art (e.g. by spray-applying 3 to 4 mils of wet coating onto a metal panel, and heating in a 150° C. forced air oven for 30 minutes). The substrate may be any common substrate such as, for example, paper, polyester films such as, for example, polyethylene or polypropylene, metals such as, for example, aluminum or steel, glass, urethane elastomers, primed (painted) substrates, and the like. An ambient oxidative cure composition of the invention may be cured at room temperature (ambient cure).

An ambient oxidative cure composition of the invention may further contain at least one coating additive in order to, for example, enhance the composition's drying efficiency Examples of suitable coating additives include, but are not limited to, leveling and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, NW., Washington, D.C. 20005. Further examples of such additives may be found in U.S. Pat. No. 5,371,148.

Examples of flatting agents include, but are not limited to, synthetic silica, available from the Davison Chemical Division of W. R. Grace & Company as SYLOID ®; polypropylene, available from Hercules Inc., as HERCOFLAT ®; synthetic silicate, available from J. M. Huber Corporation, as ZEOLEX ®.

Examples of dispersing agents include, but are not limited to, sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA ®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK ® of Buckman Laboratories Inc.; BYK ® of BYK Chemie, U.S.A.; FOAMASTER ® and NOPCO ® of Henkel Corp./ Coating Chemicals; DREWPLUS ® of the Drew Industrial Division of Ashland Chemical Company; TRYSOL ® and TROYKYD ® of Troy Chemical Corporation; and SAG ® of Union Carbide Corporation.

Examples of U.V. absorbers and U.V. light stabilizers include, but are not limited to, substituted benzophenone, substituted benzotriazoles, hindered amines, and hindered benzoates, available from American Cyanamid Company as CYASORB UV ®, and diethyl-3-acetyl-4-hydroxy-benzyl-phosphonate, 4-dodecyloxy-2-hydroxy benzophenone, and resorcinol monobenzoate.

Examples of solvents are well known and include, but are not limited to, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol monooctyl ether, diacetone alcohol, TEXANOL® ester alcohol (Eastman Chemical Company), and the like. Such solvents may also include reactive solvents such as, for example, diallyl phthalate, SANTOLINK XI-100 ® polyglycidyl allyl ether from Monsanto, and others as described in U.S. Pat. Nos. 5,349,026 and 5,371,148.

The invention also provides a method of preparing an ambient oxidative cure composition comprising the step of contacting an acrylate functionalized alkyd resin with at least one drier in the presence of an organic solvent, each as described above. An acrylate functionalized alkyd resin may be prepared as described above. Preferably, the acrylate functionalized alkyd resin is reacted with at least one drier present in amount of about 0.01–1.0 wt % in an organic solvent.

The following examples are given to illustrate the invention. It should be understood, however, that the invention is not to be limited to the specific conditions or details described in these examples.

The examples of various coating compositions of the invention use the following materials not described above:

PAMOLYN 200 a tall oil fatty acid, sold by Hercules Incorporated of Wilmington, Del.

FASCAT 4100 an esterification catalyst, sold by M&T Chemicals of Rahway, N.J.

FC-430 is a fluorocarbon additive sold by 3M Corp of St. Paul, Minn.

calcium CEM-All is a calcium carboxylate sold by OM Group of Cleveland, Ohio.

The following methods were used to evaluate the coatings and films prepared according to the invention.

Tack Free Cotton Test:

The coating is considered tack free if it does not pull fibers when the film surface is in contact with absorbent cotton fibers.

Through Dry Thumb Test:

The coating is considered through dry if it is not affected (no wrinkling) by pressing and twisting with the thumb on the surface of the film.

Zapon Tack Free Test:

A piece of 1 by 4 inch aluminum metal strip is bent to give a 1 by 1 inch of base and at an angle such that a 5 g weight would just enough to hold the base without tilting over. This metal strip is set on the coating film and a steel cylinder (500 g weight, 1 inch in diameter) is placed on the base for 45 seconds. The film is considered Zapon tack free if the aluminum strip tilts over as soon as the cylinder weight is removed.

EXAMPLES

As described in the following examples, hydroxyl functional alkyd resins 1 & 2 were synthesized and subsequently modified with glycidyl methacrylate (GMA) to form, respectively, acrylate functionalized alkyd resin 1 & 2. Hydroxyl functional alkyd resin 1 was cut in xylene to 70% solids before the modification process to reduce the viscosity, while hydroxyl functional alkyd resin 2 which had a lower $T_g$ (and therefore lower viscosity) was used directly for modification.

Example 1

Preparation of Hydroxyl Functional Alkyd Resin 1

To a three-neck, round-bottom flask equipped with a mechanical stirrer, a steam-jacketed partial condenser, a Dean-Stark trap, a nitrogen inlet, and a water condenser were charged neopentyl glycol (NPG) (53.89 g, 0.52 mol); trimethylolpropane (TMP) (139.87 g, 1.04 mol); isophthalic acid (IPA) (201.82 g, 1.22 mol); benzoic acid (BA) (30.37 g, 0.25 mol); and FASCAT 4100 (Atochem) (0.32 g). The mixture was allowed to react at 180° C.-220° C. until 47.5 g of the condensate (water) was obtained. After the mixture was cooled, PAMOLYN 200 (Hercules) (209.06 g, 0.72 mol) and FASCAT 4100 (0.32 g) were then added. The reaction was allowed to continue at 190°-220° C. until an acid number of 1.8 was obtained. The resulting resin was allowed to cool to 120° C. and xylene (246 g) added to yield a resin solution with 70% solids.

Example 2

Preparation of Acrylate Functionalized Alkyd Resin 1

To a three-neck, round-bottom flask equipped with a mechanical stirrer, a water condenser, and a nitrogen inlet were charged the hydroxyl functional alkyd resin 1 of Example 1 (300 g, 70%) and trimellitic anhydride (TMA) (8.9 g, 0.046 mol). The reaction mixture was stirred at 150° C. for 6 hr and then allowed to cool to 110° C. Glycidyl methacrylate (GMA) (13.1 g, 0.092 mol), was subsequently added. The reaction was allowed to continue at 150° C. for 1.5 hr to yield a clear resin with an acid number of 2.9.

Example 3

Preparation of Hydroxyl Functional Alkyd Resin 2

To a three-neck, round-bottom flask equipped with a mechanical stirrer, steam-jacked partial condenser, a Dean-Stark trap, a nitrogen inlet, and a water condenser were charged neopentyl glycol (NPG) (97.80 g, 0.94 mol); pentaerythritol (PE) (70.14 g, 0.52 mol); isophthalic acid (IPA)

(36.60 g, 0.22 mol); phthalic anhydride (PA) (107.22 g, 0.72 mol); and FASCAT 4100 (0.30 g). The mixture was allowed to react at 190° C.–200° C. until 19.5 g of the condensate (water) was obtained. After the mixture was cooled, PAMOLYN 200 (295.77 g, 1.02 mol) and FASCAT 4100 (0.30 g) were then added. The reaction was allowed to continue at 200° C. until an acid number of 0.9 was obtained. The resulting resin was isolated neat (100% solids).

Example 4

Preparation of Acrylate Functionalized Alkyd Resin 2

To a three-neck, round-bottom flask equipped with a mechanical stirrer, a water condenser, and a nitrogen inlet were charged the hydroxyl functional alkyd resin 2 of Example 3 (210 g) and trimellitic anhydride (TMA) (8.9 g, 0.046 mol). The reaction mixture was stirred at 165° C. for 3.5 hr and then allowed to cool to 110° C. Glycidyl methacrylate (GMA) (13.1 g, 0.092 mol), was subsequently added. The reaction was allowed to continue at 160° C. for 2 hr to yield a clear resin with an acid number of 2.9. The resulting resin was allowed to cool to 120° C. and xylene (57 g) added to yield a resin solution having 80% solids.

Example 5

Enamel Coating Composition

A pigment grind was first prepared by using a Dispermat mixer (BYK-Chemie) to blend the acrylate functionalized alkyd resin 1 of Example 2 (16.23 g, 71.8% in xylene), TiO (Du Pont, Ti-Pure R-900, 35.00 g), FC-430 (3M, 0.16G (20% in isopropanol)) until a particle size of Hegman 7+was obtained. Next, additional acrylate functionalized alkyd resin 1 (32.46, 71.8%g), cobalt drier (6%, NUODEX, Tenneco Chemicals), calcium CEM-All (4%, OM Group), and xylene (7.05 g) were added to the grind. The mixture was further stirred to give a homogeneous white paint.

Enamels coating compositions based on hydroxyl functional alkyd resins 1 & 2 of, respectively, Examples 1 and 3, and the acrylate functionalized alkyd resin 2 of Example 4 were prepared similarly as in Example 5. The solvent content was adjusted for each enamel to give an applicable viscosity.

Example 6

Film Dry Time

In order to compare their dry times, enamels coating compositions having high solids were formulated from (a) hydroxyl functional alkyd resin 1: (b) hydroxyl functional alkyd resin 2; (c) acrylate functionalized alkyd resin 1; and (d) acrylate functionalized alkyd resin 2. The resulting enamels had the following % solids:

(a) hydroxyl functional alkyd resin 1: 75%;
(b) hydroxyl functional alkyd resin 2: 91%;
(c) acrylate functionalized alkyd resin 1: 75%; and
(d) acrylate functionalized alkyd resin 2: 84%.

As shown in Table I, the various dry times of the enamel composition based on acrylate functionalized alkyd resins were much shorter than those based on the hydroxyl functional alkyd resins. Hydroxyl functional alkyd resin 2 was formulated for comparison purpose only since its viscosity was too low to be suitable for coating applications.

TABLE I

Dry Times of Hydroxyl Functional Alkyd Resins and Acrylate Functionalized Alkyd Resins

| Film Test | Hydroxyl Functional Alkyd Resin 1 | Acrylate Functionalized Alkyd Resin 1 | Hydroxyl Functional Alkyd Resin 2 | Acrylate Functionalized Alkyd Resin 2 |
|---|---|---|---|---|
| Tack Free | 2.5 hr. | 1.5 hr | 4 days | 4 hr |
| Through Dry | 8 days | 3 hr | 10 days | 7 hr |
| Zapon Tack Free | >6 days | 30 hr | weeks | 6 days |

Tack Free: cotton test; Through Dry: thumb test; Zapon Tack Free: measured for 45 sec.

It should be understood that the foregoing discussion and examples merely present a detailed description of certain preferred embodiments. It will be apparent to those of ordinary skill in the art that various modifications and equivalents can be made without departing from the spirit and scope of the invention. All the patents, journal articles and other documents discussed or cited above are herein incorporated by reference.

The claimed invention is:

1. An ambient oxidative cure composition comprising:
   (a) an acrylate functionalized alkyd resin comprising the reaction product of:
      (i) a carboxyl functional alkyd resin; and
      (ii) a glycidyl acrylate
   wherein the glycidyl moiety of the glycidyl acrylate is the reactive moiety and the reaction product contains terminal reactive acrylate moieties;
   (b) at least one drier; and
   (c) an organic solvent.

2. An ambient oxidative cure composition of claim 1, wherein
   (a) the acrylate functionalized alkyd resin is present in about 50 to about 80 wt % based on the total composition;
   (b) the drier is present in about 0.01 to about 1.0 wt % based on the total composition; and
   (c) the organic solvent is present in about 10 to 50 wt % based on the total composition.

3. An ambient oxidative cure composition of claim 1, wherein the acrylate functionalized alkyd resin comprises the reaction product of:
   (i) about 87 to about 97 wt % of the carboxyl functional alkyd resin; and
   (ii) about 3 to about 13 wt % of the glycidyl acrylate, wherein the weight percents are based on the total weight of (i) and (ii).

4. An ambient oxidative cure composition of claim 1, wherein the carboxyl functional alkyd resin comprises the reaction product of a hydroxyl functional alkyd resin and an acid anhydride, wherein the hydroxyl functional alkyd resin comprises:
   (a) 0 to about 30 mole % of a diol;
   (b) about 10 to 40 mole % of a polyol;
   (c) about 20 to 40 mole % of a diacid;
   (d) 0 to about 10 mole % of a monofunctional acid; and
   (e) about 10 to about 40 mole % of a fatty acid, fatty ester, or naturally occurring-partially saponified oil, wherein the mole percents are based on the total moles of (a), (b), (c), (d) and (e).

5. An ambient oxidative cure composition of claim 4, wherein the diol is neopentyl glycol, the polyol is trimethylolpropane or pentaerythritol, the diacid is isophthalic acid, isophthalic anhydride or phthalic acid, and the monofunctional acid is benzoic acid.

6. An ambient oxidative cure composition of claim 1, wherein the drier is selected from the group consisting of salts of cobalt, zirconium, calcium, zinc and manganese.

7. An ambient oxidative cure composition of claim 4, wherein the hydroxyl functional alkyd resin has a hydroxyl number of about 80 to about 180 mg KOH/g.

8. An ambient cure composition of claim 3, wherein the glycidyl acrylate is glycidyl methacrylate.

9. An ambient oxidative cure composition of claim 1, further comprising at least one additive selected from the group consisting of flow control agents, extenders, plasticizers, flatting agents, pigment wetting agents, pigment dispersing agents, ultraviolet (UV) absorbers, UV light stabilizers, tinting pigments, colorants, defoaming agents, antifoaming agents, anti-settling agents, anti-sag agents, bodying agents, anti-skinning agents, anti-flooding agents, anti-floating agents and corrosion inhibitors.

10. An ambient oxidative cure enamel composition comprising:
   (a) an acrylate functionalized alkyd resin comprising the reaction product of:
      (i) a carboxyl function alkyd resin; and
      (ii) a glycidyl acrylate
   wherein the glycidyl moiety of the glycidyl acrylate is the reactive moiety and the reaction product contains terminal reactive acrylate moieties;
   (b) at least one drier;
   (c) an organic solvent; and
   (d) at least one pigment.

11. An ambient oxidative cure enamel composition the pigment is present in about 30 to about 60 wt % based on the total weight of the composition.

12. An ambient oxidative cure enamel composition of claim 11 further comprising at least one additive selected from the group consisting of flow control agents, extenders, plasticizers, flatting agents, pigment wetting agents, pigment dispersing agents, ultraviolet (UV) absorbers, UV light stabilizers, tinting pigments, colorants, defoaming agents, antifoaming agents, anti-settling agents, anti-sag agents, bodying agents, anti-skinning agents, anti-flooding agents, anti-floating agents and corrosion inhibitors.

13. A method of preparing an ambient oxidative cure composition comprising the step of: reacting a carboxyl functional alkyd resin with the glycidyl moiety of a glycidyl acrylate to form an acrylate functionalized resin, and contacting the acrylate functionalized alkyd resin with at least one drier in the presence of an organic solvent.

14. A method of claim 13, wherein the glycidyl acrylate is glycidyl methacrylate.

15. A substrate coated with an ambient oxidative cure composition of claim 1.

16. A substrate coated with an ambient oxidative cure enamel composition of claim 10.

17. A substrate coated with an ambient oxidative cure enamel composition of claim 12.

* * * * *